(12) United States Patent
Gutierrez-Castaneda et al.

(10) Patent No.: US 8,838,293 B2
(45) Date of Patent: Sep. 16, 2014

(54) FUNCTIONAL MONITOR FOR FLIGHT MANAGEMENT SYSTEM

(75) Inventors: Manuel Gutierrez-Castaneda, Toulouse (FR); Guy Deker, Cugnaux (FR)

(73) Assignee: Thales, Neuilly-sur-Seine (FR)

(*) Notice: Subject to any disclaimer, the term of this patent is extended or adjusted under 35 U.S.C. 154(b) by 1793 days.

(21) Appl. No.: 11/642,659

(22) Filed: Dec. 21, 2006

(65) Prior Publication Data
US 2007/0142981 A1   Jun. 21, 2007

(30) Foreign Application Priority Data
Dec. 21, 2005   (FR) ...................................... 05 13001

(51) Int. Cl.
*G01C 23/00* (2006.01)
*G05D 1/00* (2006.01)
*G05D 3/00* (2006.01)
*G06F 7/00* (2006.01)
*G06F 17/00* (2006.01)
*G05B 23/02* (2006.01)

(52) U.S. Cl.
CPC ............ *G01C 23/00* (2013.01); *G05B 23/0256* (2013.01)
USPC ............ 701/3; 701/8; 701/9; 701/11; 701/14; 701/1

(58) Field of Classification Search
None
See application file for complete search history.

(56) References Cited

U.S. PATENT DOCUMENTS

| | | | | |
|---|---|---|---|---|
| 4,413,316 A * | 11/1983 | Blue et al. | | 701/3 |
| 5,161,158 A * | 11/1992 | Chakravarty et al. | | 714/26 |
| 5,184,312 A * | 2/1993 | Ellis | | 702/121 |
| 5,541,863 A * | 7/1996 | Magor et al. | | 702/122 |
| 5,552,984 A * | 9/1996 | Crandall et al. | | 702/183 |
| 6,053,737 A * | 4/2000 | Babbitt et al. | | 434/30 |
| 6,106,298 A * | 8/2000 | Pollak | | 434/29 |
| 6,134,500 A * | 10/2000 | Tang et al. | | 701/528 |
| 6,421,603 B1 * | 7/2002 | Pratt et al. | | 701/528 |
| 6,519,527 B2 * | 2/2003 | Shinagawa | | 701/411 |
| 6,522,958 B1 * | 2/2003 | Dwyer et al. | | 701/3 |
| 6,574,537 B2 * | 6/2003 | Kipersztok et al. | | 701/31.8 |
| 6,643,580 B1 * | 11/2003 | Naimer et al. | | 701/206 |
| 6,687,606 B1 * | 2/2004 | Moitra et al. | | 701/400 |
| 6,748,325 B1 * | 6/2004 | Fujisaki | | 701/301 |
| 6,789,007 B2 * | 9/2004 | Ellis et al. | | 701/34.3 |
| 6,922,631 B1 * | 7/2005 | Dwyer et al. | | 701/528 |

(Continued)

FOREIGN PATENT DOCUMENTS

EP     1 121 678 A     8/2001

OTHER PUBLICATIONS

Robb, D. et al. "Design of a Low Cost, Fault Tolerant Flight Management and Control System for General Aviation Aircraft", Proceedings of the Digital Avionics Systems Conference, Virginia Beach, Oct. 15-18, 1990, New York, IEEE, US, vol. Conf. 9, Oct. 15, 1990, pp. 212-217, XP000224561.

*Primary Examiner* — Bhavesh V Amin
(74) *Attorney, Agent, or Firm* — Lowe Hauptman & Ham, LLP

(57) ABSTRACT

The invention relates to a flight management system for aircraft which makes it possible to carry out tests of the results of the calculations of the main functions for formulating the flight plans and trajectories of the aircraft making it possible to anticipate errors in this formulation, to present them to the crew as a function of criticality criteria, to store them so as to be communicated and processed by the maintenance teams.

15 Claims, 4 Drawing Sheets

(56) References Cited

U.S. PATENT DOCUMENTS

| | | |
|---|---|---|
| 6,985,810 B2 * | 1/2006 | Moitra et al. .................. 701/410 |
| 7,188,059 B2 * | 3/2007 | White et al. .................... 703/13 |
| 7,209,814 B2 * | 4/2007 | Kipersztok et al. .......... 701/31.6 |
| 7,228,207 B2 * | 6/2007 | Clarke et al. ...................... 701/3 |
| 7,650,232 B1 * | 1/2010 | Paielli ........................... 701/528 |
| 2005/0223290 A1 | 10/2005 | Berbaum et al. |

\* cited by examiner

FUNCTIONAL MONITOR FOR FLIGHT MANAGEMENT SYSTEM

RELATED APPLICATION

The present application is based on, and claims priority from, France Application Number 0513001, filed Dec. 21, 2005, the disclosure of which is hereby incorporated by reference herein in its entirety.

FIELD OF THE INVENTION

The present invention applies to the flight management systems for aircraft with onboard or off-board pilot. Such systems provide piloting assistance functions to determine and monitor the optimal course to be followed by the aircraft to home in to its destination starting from its departure point.

SUMMARY OF THE INVENTION

Whatever the quality of the development, testing and integration procedures of the vendors of such systems and the rigor of the acceptance and certification processes of the aircraft manufacturers and airlines, software bugs remain which appear only in the operational phase. The airborne real-time systems, such as the automatic piloting system, are normally protected against the consequences of such bugs by a device for testing the instantaneous values of the critical calculated data, on the one hand with respect to spans of values, minimum and maximum, and on the other hand by comparing the results of the chain to be overseen with the results of an identical chain acting as monitor (conventional redundancy principle COM/MON). The deficient values bring about hang-up of the automatic system and its reinitialization. This protection is suitable for systems whose calculated data are used immediately. It is however insufficient for the flight management systems consisting of sub-systems which produce data which may remain latent for a long time before being used by another function or another sub-system. For example, the horizontal trajectory generated by the flight management system on the basis of a series of standard legs of the flight plan may exhibit incoherences apt to undermine the safety of the trajectory of the aircraft if the straight segments of a length greater than a predetermined threshold are not superposed or do not converge towards the leg which is the origin of these segments.

The problem which is not solved by the prior art and that the Applicant has solved is the anticipation by the tools for testing and/or monitoring of the constraints and criteria to be satisfied to guarantee the functional integrity of the end-to-end results through the various sub-systems.

For this purpose, the present invention proposes a device for aiding navigation of an aircraft comprising modules for formulating flight plans and trajectories of said aircraft, characterized in that it furthermore comprises a test module for testing the data at the output of one of said modules with respect to conditions determined by subsequent phases of formulation of said flight plan and trajectories.

It also proposes a method of using said device.

BRIEF DESCRIPTION OF THE DRAWINGS

The invention furthermore has the further advantage of allowing the generation of anticipated alerts for the crew and storage of the incidents with their context of occurrence for the purposes of communication to the system vendor and/or to the operator for maintenance. Still other advantages of embodiments according to the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention.

The invention will be better understood and its various characteristics and advantages will emerge from the description which follows of several exemplary embodiments and of its appended figures of which.

Figure 1:
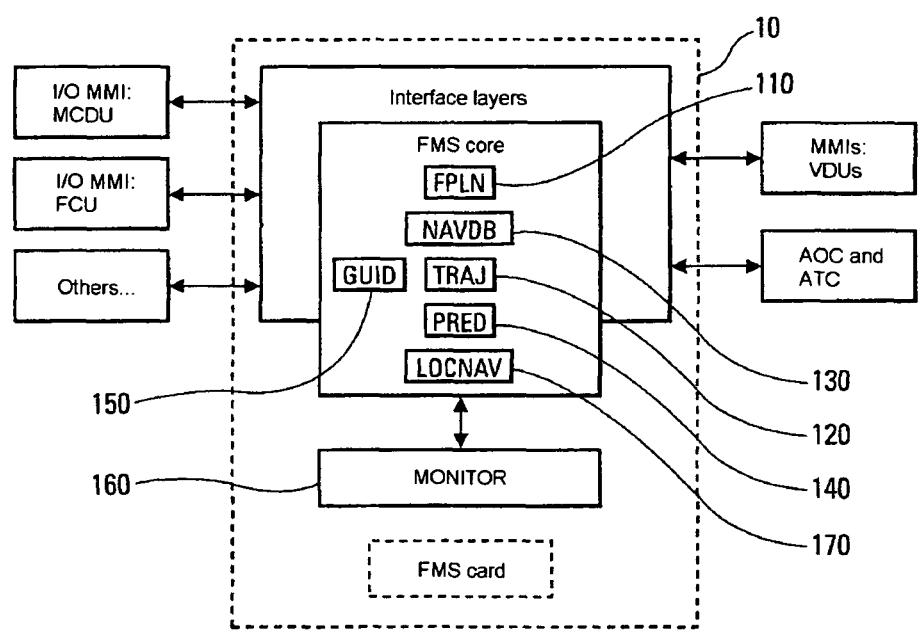
FIG. 1 represents the functional architecture of a flight management system incorporating the invention.

In the description and the figures, the initials, acronyms and abbreviations have the meaning indicated in the table below. We give both the development of the initials and possibly, its actual meaning.

| Initials | Development | Meaning |
|---|---|---|
| ACARS | ARINC Communications Addressing and Reporting System | ARINC addressing communications and reporting system |
| AOC | Airline Operations Center | Center of operations of the airline |
| AP | Auto pilot | Automatic pilot |
| ARINC | Aeronautical Radio, Inc. | Aeronautical Radio, Inc. |
| ATC | Air Traffic Control | Monitoring of air traffic |
| BDN/NAVDB | Navigation database | Navigation database |
| CA | Course to an Altitude leg | Leg for holding a course up to an altitude |
| CD | Course to a DME Distance leg | Leg for holding a course up to a given distance to a DME beacon |
| CF | Course to a fix leg | Leg for holding a course up to a fixed point |
| CI | Course to an intercept | Leg for holding a course up to the interception of a following leg |
| CR | Course to a Radial leg | Leg for holding a course up to the interception of a radial at a given point |
| DATALINK | Communication link | Communication link |
| DME | Distance Measuring Equipment | Distance Measurement Equipment |
| E/S | Inputs/Outputs | |
| EWD | Engine Warning Display | Displaying of the engine alarms |
| GALILEO | European GPS Constellation | |
| GPS | Global Positioning system | Global positioning system |
| GUID | Guidance | |
| FA | Course from a fix to an altitude | Leg for holding a course from a fixed point up to an altitude |
| FC | Course from a fix to a distance | Leg for holding a course from a fixed point up to a distance |
| FCU | Flight Controls Unit | Unit for monitoring the flight |
| FD | Course from a fix to a DME distance | Leg for holding a course from a fixed point up to a given distance to a DME beacon |
| FM | Flight Manage-r(-ment) | Flight Management (Manager) |

| Initials | Development | Meaning |
|---|---|---|
| FMS | Flight Management system | Flight management system |
| FPLN | Flight Plan | Flight plan |
| HPATH | Horizontal Path law | Horizontal trajectory law |
| IHM | Man Machine Interface | |
| MCDU | Multi-function Control Display Unit | Unit for Displaying and monitoring multiple functions |
| LEG | unitary standardized element of a flight plan (defined in the ARINC 424 standard) | |
| NAVDB/BDN | Navigation database | Navigation database |
| PRED | Prediction | Prediction |
| RESET | Reset | Reinitialization |
| SD | System Display | System Monitor |
| RNP | Required Navigation Performance | Navigation performance level |
| TRAJ | Trajectory | Trajectory |
| VA | Heading to an altitude leg | Leg for holding a Heading up to an altitude |
| VD | Heading to a DME distance leg | Leg for holding a Heading up to a distance to a DME beacon |
| VHF | Very High Frequency | Very high frequency |
| VI | Heading to an intercept leg | Leg for holding a Heading up to the interception of the following leg |
| VISU | Display console | |
| VM | Heading to a manual termination leg | Leg for holding a Heading up to a manual termination |
| VR | Heading to a Radial termination leg | Leg for holding a Heading up to the interception of a radial at a given point |
| VX | Heading type leg | Leg for holding a Heading |

DETAILED DESCRIPTION OF THE DRAWINGS

The present invention is illustrated by way of example, and not by limitation, in the figures of the accompanying drawings, wherein elements having the same reference numeral designations represent like elements throughout and wherein:

FIG. 1 presents the functional architecture of an FMS 10. This system satisfies the ARINC 702 standard (Advanced Flight Management Computer System). They normally ensure all or part of the functions of: navigation LOCNAV, 170, for performing the optimal locating of the aircraft as a function of the geolocating means (GPS/GNSS, VHF radio beacons, inertial and anemo-barometric platforms); flight plan FPLN, 110—Navigation database NAVDB, BDN, 130, for constructing geographical routes on the basis of procedures and of data included in the bases (points, beacons, fixed legs or those with variable termination related to interception of course or of altitude etc.); lateral trajectory TRAJ, 120: for constructing a continuous trajectory on the basis of the points of the flight plan, complying with the airplane performance and the confinement constraints (RNP); predictions PRED, 140: for constructing a vertical profile optimized on the lateral trajectory and the associated predictions in terms of speed, altitude, time of transit and consumption; guidance GUID, 150, for guiding in the lateral, vertical and speed planes the aircraft over its 4D trajectory, while optimizing the speed; AOC/ATC: digital data link for communicating with the control centers and the other aircraft. According to the category of the aircraft, only some of the functions above may be installed.

The invention is implemented principally in the MONITOR module, 160. This functional module, advantageously programmed in ADA or C++ source language according to appropriate procedures so that the code is certifiable, may be installed on a standard FMS computer. The monitor will be as independent of the other modules of the FMS as possible.

The monitor will advantageously comprise a library of tests to be performed in particular conditions of the aircraft and of its environment. It can thus be broken down into monitoring functions dedicated to a localized functional and system environment. Among the possible test situations, the following cases constitute typical examples of prevention or monitoring of bugs or erroneous pilot inputs possible with an FMS, exhibiting a generic nature:

Use in the flight plan of a nonexistant beacon in the NAVDB navigation base;

Access to an MCDU page exhibiting inconsistencies;

Input by the pilot of a course point completely disaligned with respect to the reference flight plan, for example, on a North Atlantic crossing, insertion of a point with a South latitude;

Approach speed incompatible with the airplane weight and the course to be travelled, a permitted span of the values being calculated by the monitor by a different (but compatible) procedure from that of the operational calculation;

Values of trajectory distances that are aberrant with respect to the real distances between points on the course;

Set of lateral segments exhibiting inconsistencies in the rejoins; for example, the trajectory calculated by the FMS contains a long straight segment at 270°, while the leg appearing in NAVDB on which this segment is situated is a 90° CF leg, and the segment at 270° represented in space cannot be a rejoin HPATH of the definite leg.

The libraries of tests may also apply to situations that are much more infrequent which one desires to test because of their criticality:

Wrong rotation speed VR input by the pilot, which may result in aircraft tail scraping on the runway;

Unidentified lateral segment after sequencing of a leg with termination in altitude: the airplane without reference banks for example to the left with the risk of steering towards a flight zone intended for the other runways and/or with a trajectory towards a relief.

In certain cases, the systematic carrying out of certain tests may turn out useful or even necessary. However, for reasons of economy of the computed resources, each test in a library will in principle be carried out only when predetermined conditions of execution of these tests are met. Moreover, it is pointless to re-execute a test already carried out if no data item of an FMS sub-system has changed, a situation that is characterized by the absence of change of version of the data.

Figure 2:
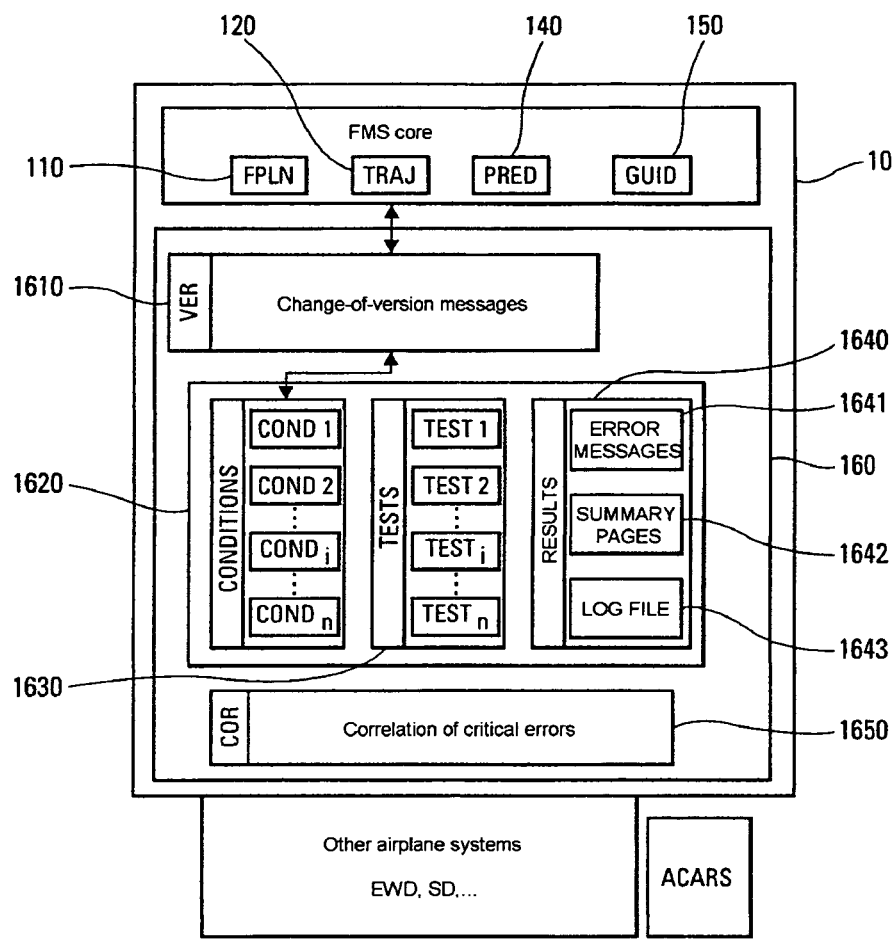
FIG. 2 represents the functional architecture of an FMS monitor according to the invention.

By reference to FIG. 2 which represents a MONITOR, 160 according to the invention, an advantageous implementation therefore consists in envisaging a first sub-module VER, 1610 for processing and storing the messages of change of version of the data calculated by the modules of the FMS core: FPLN, 110, TRAJ, 120, PRED, 140 and GUID, 150. The database also stores the last version of the dataitself. The monitor will preferably store the data version used to decide that the associated tests of the library must be carried out. At the output of this sub-module, a second sub-module CONDITIONS, 1620 tests the conditions $COND_i$, $COND_j$ . . . $COND_n$ to be individually satisfied for carrying out the $TEST_i$, $TEST_j$ . . . $TEST_n$ respectively. A third sub-module TESTS, 1630 constitutes is library of the n tests which will be carried out under the command of the CONDITIONS sub-module. A fourth sub-module RESULTS, 1640 organizes the presentation and storage of the errors detected by the tests. This latter module comprises a first function ERROR MESSAGES, 1641 which formulates the error messages at the output of the tests, for example in one of the cases cited above "INCOHERENT LATERAL SEGMENT AHEAD" or "Incoherent lateral segment on the course". It also comprises a SUMMARY PAGES function, 1642 which produces the data to be displayed for the crew, for example the data relating to the legs in NAVDB which caused the inconstitency and to the lateral segments associated with these legs; this function furthermore carries out a filtering and a sorting of the information to be brought to the attention of the crew; the filtering and sorting criteria are defined as a function of the criticality indices of the errors; they may rely on a correlation with the data produced by other airplane systems such as the system monitoring SD or the engine monitoring EWD, this correlation is performed in a sub-module COR, 1650; criticality indices are also defined by the OACI and State regulations, as well as by the airlines. A LOG FILE function, 1643 lists the data to be stored for communication to the maintenance services of the airline and to the FMS; vendor data comprises, in addition to the functional data at the output of the tests additional data on the hardware and software environment at the time when the error occurred; they are advantageously formatted so as to be transmitted by ACARS link to the airline.

Figure 3:
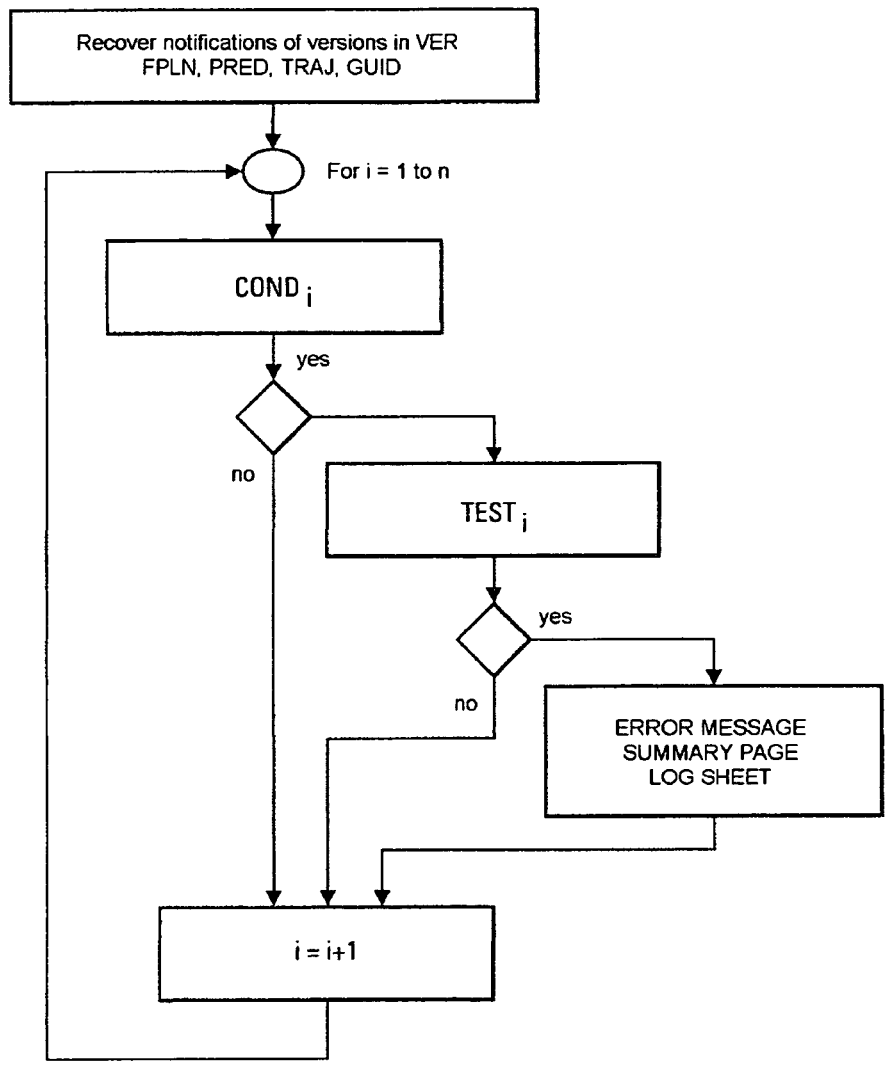
FIG. 3 shows the flowchart of the processings in a first embodiment of the invention.

There exist two variants of the method for carrying out the invention. They are defined by the flowcharts of the processings of FIGS. 3 and 4. They have in common most of the steps of the processings for a test $TEST_i$: verification of the conditions $COND_i$ of execution of the test, which is performed by recovering the new version notifications (FPLN, PRED, TRAJ) issued by the functions of the FM core, and the pattern of the new version, then by identifying the tests which need to be executed on the basis of the notified versions; for each test $TEST_i$: acquisition of the data of the FM core necessary for the verification, execution of the verification algorithm, then issuing or not of an error message, creation or not of a summary page, creation or not of a log file.

An exemplary embodiment of the invention is given below. The test carried out is the compatibility of the TRAJ and NAVDB data:
Recover from the FMS core the series of lateral legs of the flight plan.
Recover the whole of the associated trajectory (series of lateral segments calculated on the basis of the ARINC 424 definitions of the legs),
For each leg of type CA, CD, CF, CI, CR, FA, FC, FD, FM, VA, VD, VI, VM, VR, analyse the associated lateral segments (curved segments and straight segments):
IF
for these types of legs there exist associated straight segments of length greater than a predetermined threshold,
AND,
these straight segments are not identified in the trajectory as HPATH joining segments,
AND,
the track (course) (or heading for the VX legs) of the straight segment is "different" from the track (heading) defining the associated arinc leg,
THEN,
Dispatch a message to the scratchpad (band in the bottom part of the MCDU screen serving to display messages for the pilots) "INCOHERENT LATERAL SEGMENT AHEAD"
Write a DATA page summarizing the incoherence comprising as info:
The NAVDB identifier of the leg on which the incoherence has been raised
The ARINC definition of the leg,
The set of lateral segments associated with this leg,
The lateral segment considered to be incoherent
Record an internal file comprising:
Time date, Identification number of the software, of the hardware, of the airplane and of the type of engines, etc.
Identifier of the type of incoherence "INCOHERENT LATERAL SEGMENT AHEAD"
Flight plan, Source, Points on the course, destination, weight
Detail of n scheduled legs and lateral segments preceding, comprising and following the incoherence.

The variants are distinguished by their primary sequencer. In that of FIG. 3, it is the change of version (refreshing of one of the data of the sub-modules FLPN, TRAJ, PRED, GUID of the core of the FMS) which triggers the call to the monitor. This change of version can be notified to the monitor by cyclic polling of the FMS core. In this case, the cycle is of relatively long period (30 s to 1 minute). The systematic polling can be replaced with a subscription of the monitor to the service of message-based notification of the change-of-version event. Thereafter, for i from 1 to n, the condition for carrying out test i, $COND_i$, is verified in regard to the data arising from the last change-of-version message. When $COND_i$ is fulfilled, $TEST_i$ is executed then, if appropriate, ERROR MESSAGE, SUMMARY PAGE, LOG FILE.

Figure 4:
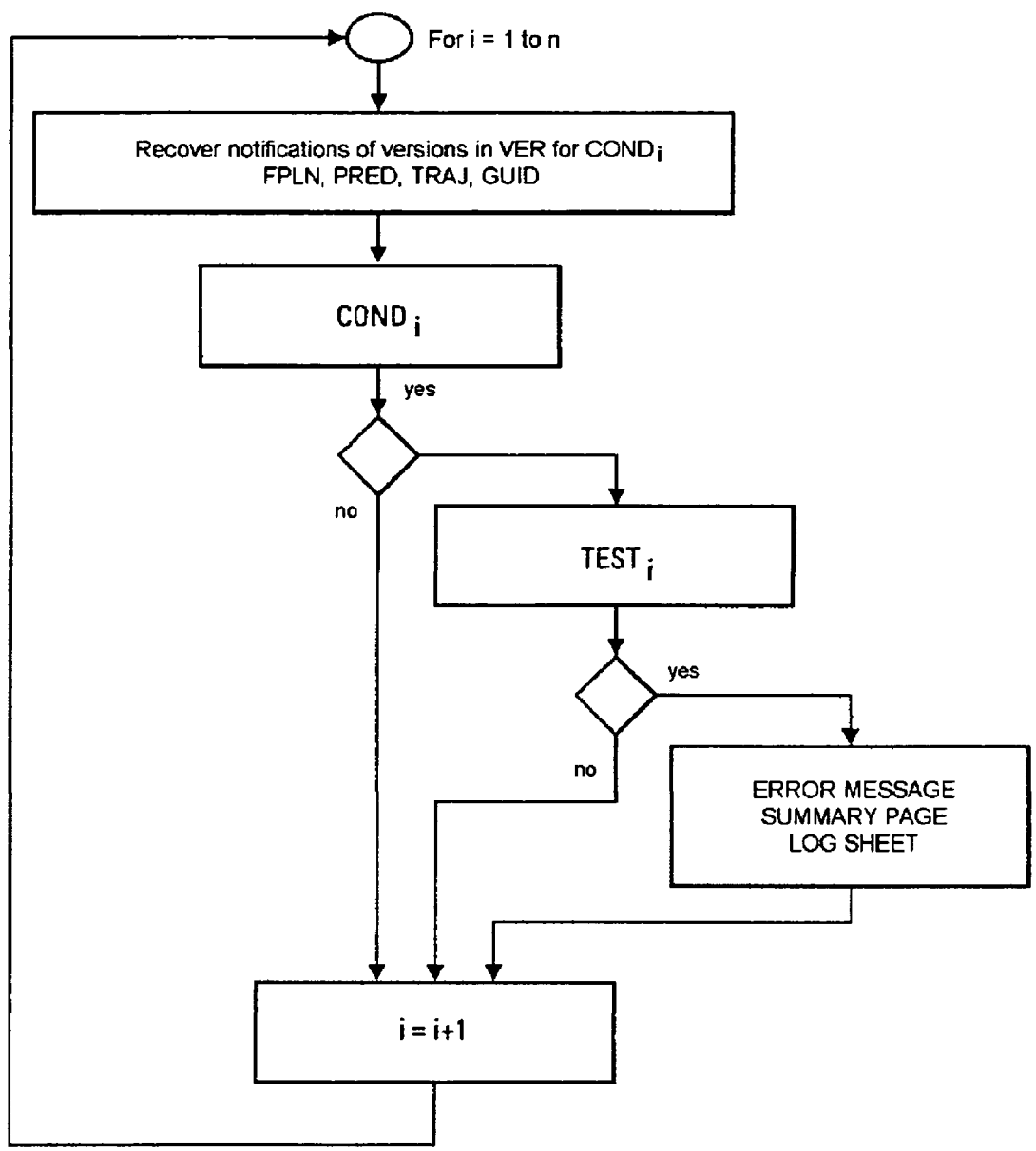
FIG. 4 illustrates the flowchart of the processings in a second embodiment of the invention.

In the variant of FIG. 4, for each test i from 1 to n, the CONDITIONS sub-module recovers for each $COND_i$ to be verified the last versions of the input data then when $COND_i$ is fulfilled, $TEST_i$ is executed then, if appropriate, ERROR MESSAGE, SUMMARY PAGE, LOG FILE.

It is also possible to combine the two variants into a hybrid variant to optimize the utilisation of computer resources. It is indeed advantageous to factorize the verifications of the conditions of execution of the tests $COND_i$ which have common input data.

It will be readily seen by one of ordinary skill in the art that embodiments according to the present invention fulfill many of the advantages set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A monitor for a flight management system of an aircraft, said monitor comprising:
at least a first module for recovering versions of data residing in memory of said flight management system in relation to flight plans and trajectories of said aircraft, and
a second module for performing at least one test of said data at an output of said first module,
wherein, said second module is configured such that, when one of said versions of the data residing in memory has changed in relation to a previous state, said at least one test is performed with respect to conditions of validity of said data to be satisfied for avoiding erroneous execution and/or abort of subsequent phases of said flight plans and trajectories, and allowing interruption of said execution if said at least one test is negative.

2. The monitor of claim 1, wherein said second module comprises a library of tests to be executed each in a given configuration of the aircraft and of environment.

3. The monitor of claim 1, further comprising a database including results breaching conditions at the output of said second module and of contexts of occurrence of said results.

4. The monitor of claim 3, further comprising a generator of messages of report of the results breaching conditions at the output of said second module.

5. The monitor of claim 4, wherein said generator is configured for parameterizing sortings and filterings at an output of the generator and at an input of an interface for presenting said messages to a crew.

6. The monitor of claim 4, further comprising elements for archiving said messages according to a download protocol.

7. The monitor of claim 4, further comprising elements for correlating the messages at an output of the generator with other messages originating from other devices for monitoring of the aircraft.

8. A method of monitoring a flight management system of an aircraft, said method comprising:
   at least one step of recovering versions of data residing in memory of said flight management system in relation to flight plans and trajectories of said aircraft, and
   a test and control step of performing at least one test of data at an output of said step of recovering when a version of said data residing in memory has changed in relation to a previous state, said test being performed with respect to conditions of validity of said data to be satisfied for avoiding erroneous execution and/or abort of subsequent phases of said flight plans and trajectories, and for allowing interruption of said execution if said at least one test is negative.

9. The method of claim 8, wherein said test and control step is triggered when the conditions of validity of said data are satisfied, said conditions being verified in a cyclic manner at an input of the test and control step.

10. The method of claim 8, further comprising a step of recording the results breaching conditions at the output of said test and control step and the contexts of occurrence of said results.

11. The method of claim 8, further comprising a step of generating messages of report of the results breaching conditions at the output of said test and control step.

12. The method of claim 11, wherein said step of generating comprises parameterizing sortings and filterings at the output of said generating step and at the input of a step of presenting said messages to a crew.

13. The method of claim 11, further comprising a step of archiving said messages according to a download protocol.

14. The method of claim 11, further comprising a step of correlating the messages at the output of the generating step with other messages originating from other steps for monitoring of the aircraft.

15. A flight management system monitor for a flight management system of an aircraft, said monitor comprising:
   at least one module for recovering versions of data residing in memory of said flight management system in relation to flight plans and trajectories of the aircraft, and
   a test and control module for performing tests of data at an output of said at least one module, said tests being performed with respect to conditions of validity of the data residing in memory of said flight management system, wherein said tests are to be processed in relation to said conditions of validity recovered in advance of said processing, said conditions of validity having to be satisfied for avoiding erroneous execution and/or abort of subsequent phases of said flight plans and trajectories, and for allowing interruption of said execution if one of said tests is negative.

* * * * *